United States Patent [19]

Kelton et al.

[11] Patent Number: 5,745,527
[45] Date of Patent: Apr. 28, 1998

[54] ENCODING METHOD FOR CONSTELLATION SYMBOLS OF AN RF TRANSMITTER

[75] Inventors: James Robert Kelton, Oak Park; David Paul Gurney, Palatine, both of Ill.

[73] Assignee: Motorola, Inc., Schaumburg, Ill.

[21] Appl. No.: 17,892

[22] Filed: Feb. 16, 1993

[51] Int. Cl.$^6$ .............................. H04L 27/20; H04L 27/36
[52] U.S. Cl. ........................... 375/308; 375/298; 332/103
[58] Field of Search ..................... 375/226, 262, 375/264–265, 280–281, 298, 308; 332/103, 145; 371/43

[56] References Cited

U.S. PATENT DOCUMENTS

| | | | |
|---|---|---|---|
| 4,327,439 | 4/1982 | Göckler et al. | 375/308 |
| 4,943,983 | 7/1990 | Critchlow | 375/244 |
| 4,962,510 | 10/1990 | McDavid et al. | 375/308 |
| 5,140,613 | 8/1992 | Birgenheier et al. | 375/308 |
| 5,210,775 | 5/1993 | Takahara et al. | 375/308 |
| 5,260,673 | 11/1993 | Phan | 332/103 |

OTHER PUBLICATIONS

*Digital Signal Processor—Based Programmable BPSK/QPSK/Offset—QPSK Modems,* by L. N. Lee, A Shenoy, and M. K. Eng., COMSAT Technical Review, vol. 19, No. 2. Fall, 1989, pp. 195–233.

*Primary Examiner*—Young T. Tse
*Attorney, Agent, or Firm*—Donna Rogers Maddox

[57] ABSTRACT

A method and apparatus is provided for encoding a signal within a radio frequency transmitter 10. The method includes the steps of dividing an information bit stream into a set of successive representations of constellation symbols, each with a symbol interval and finite impulse response filtering each constellation symbol of the set of successive representations of constellation symbols to produce at least one filtered symbol sample per symbol interval. The method further includes the steps of vector adding the at least one filtered symbol sample per symbol interval of the set of successive representations of constellation symbols to produce an output constellation symbol. An apparatus is provided with means for implementing the steps of the method. Included within the apparatus is a low-overhead means of selecting modulation method.

20 Claims, 3 Drawing Sheets

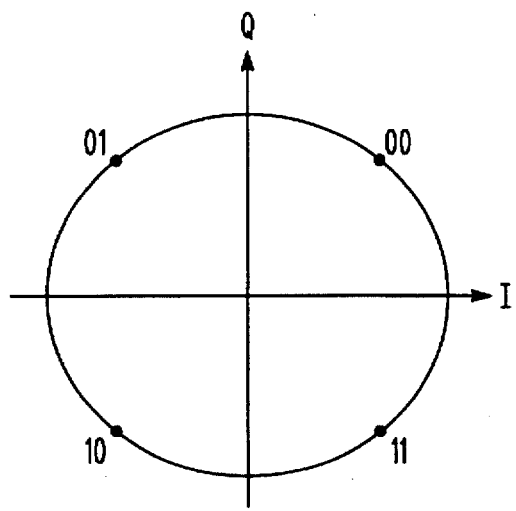
*FIG.2*
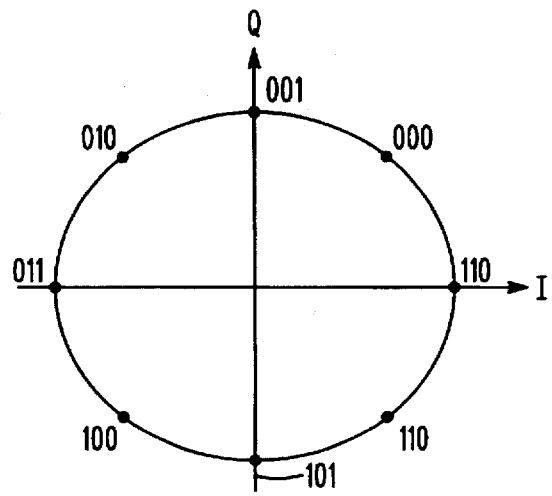
PHASE CONSTELLATION MAPPING
($0_2$ $0_1$ $0_0$)
*FIG.3*
| D0 (EVEN) | D1 (ODD) | ΔΘ (4-QAM) | ΔΘ (π/4 DQPSK) |
|---|---|---|---|
| 0 | 0 | 0 | +π/4 |
| 0 | 1 | +π/2 | +3π/4 |
| 1 | 0 | -π/2 | -π/4 |
| 1 | 1 | π | -3π/4 |
RESULTING DIFFERENTIAL PHASE ENCODING
*FIG.4*

ENCODING METHOD FOR CONSTELLATION SYMBOLS OF AN RF TRANSMITTER

FIELD OF THE INVENTION

The field of the invention relates generally to communication systems and more specifically to radio frequency transmitters using multilevel modulation.

BACKGROUND OF THE INVENTION

Radio frequency transmission systems using multi-bit encoding (e.g., quadrature amplitude modulation (QAM)) are known. Multi-bit encoding, in such systems, is typically accomplished through use of symbols within a symbol constellation. Such constellations are typically depicted graphically within a two-dimensional plane having real (I) and imaginary (Q) axis with each symbol having a binary identifier. Varying the magnitude of parameters in the I and Q planes offers the opportunity of encoding a number of bits through transmission of a single constellation symbol.

Encoding of an information signal using a symbol constellation is typically accomplished by dividing the information stream into bit groupings with the size of the bit groupings (number of bits) determined by the number of bits in the binary identifiers of the constellation (e.g., a four point constellation uses two bits per bit grouping, an eight point constellation uses three bits per bit grouping, etc.).

Differential quadrature phase shift keying (DQPSK) is also known. Within a DQPSK system a phase offset is applied to a chosen symbol based upon an identity of a prior symbol. Examples include 4-QAM DQPSK and π/4 DQPSK Encoding under such a system includes retrieval from a look-up table and transmission of symbols based upon matching the bit content of a particular bit grouping with a bit identifier of a constellation symbol. Upon retrieval and concatenation of successive symbols (producing a symbol stream) a waveforming operation is performed upon the symbol stream. Waveforming is necessitated by signal level discontinuities created by juxtaposition of non-identical symbols. Waveforming of constellation symbols, on the other hand, is complex. Symbols having an I and Q value at a symbol instant must be converted to sampled values over a symbol interval and filtered over the symbol interval.

As an alternative to waveforming, it has been suggested (*Digital Signal Processor-based Programmable BPSK/OPSK/offset-OPSK Modems*, by L. N. Lee, A. Shenoy, and M. K. Eng., COMSAT TECHNICAL REVIEW, Vol. 19, No. 2, Fall, 1989, pgs. 195–233) that adjacent symbols within the symbol stream be compared with a waveform table containing every possible symbol combination. Symbol sequences within such a table are stored as sampled values (e.g., 8 bits per symbol interval). Upon detection of a particular symbol sequence, a waveformed symbol sequence is retrieved from the waveform table and substituted as a transmitted symbol sequence. Use of such a table accommodates signal discontinuities through the use of pre-calculated waveformed symbol sequences in a transmitted symbol stream.

While the use of look-up tables has been successful, the use of look-up tables requires extensive memory. The aforementioned article (Lee, Shenoy and Eng) suggests that at least 7 consecutive symbols be considered in providing a single waveformed output. Use of the 7 consecutive symbols is necessitated by the need to bandwidth limit a transmitted symbols stream to an allocated bandwidth.

Using 7 consecutive symbols in a 4-QAM look-up table with 8 samples per symbol requires a memory of at least 8 kbytes. Because of the importance of multi-bit signal modulation using signal constellations a need exists for a method of waveformed constellation symbols that doesn't require the extensive look-up tables of the prior art.

SUMMARY OF THE INVENTION

A method and apparatus are provided for encoding a signal within a radio frequency transmitter. The method includes the steps of dividing an information bit stream into a set of successive representations of constellation symbols, each with a symbol interval and finite impulse response filtering each constellation symbol of the set of successive representations of constellation symbols to produce at least one filtered symbol sample per symbol interval. The method further includes the steps of vector adding the at least one filtered symbol sample per symbol interval of the set of successive representations of constellation symbols to produce an output constellation symbol. An apparatus is provided with means for implementing the steps of the method.

BRIEF DESCRIPTION OF THE DRAWINGS

FIG. 2 illustrates a 4-QAM constellation in accordance with an embodiment of the invention.

FIG. 3 illustrates a π/4 DQPSK constellation in accordance with an embodiment of the invention.

FIG. 4 is a tabulation of differential phase offsets provided by the constellation encoder in accordance with an embodiment of the invention.

DETAILED DESCRIPTION OF THE PREFERRED EMBODIMENT

The solution to the problem of waveforming discontinuous signals in a constellation symbol stream lies, conceptually, in finite impulse response filtering groups of adjacent symbols within the symbol stream and summing contributions to provide a waveformed output symbol for each filtered group. Following filtering, a new filter group is formed by temporally incrementing the filtered group and generating another waveformed output symbol.

Figure 1:
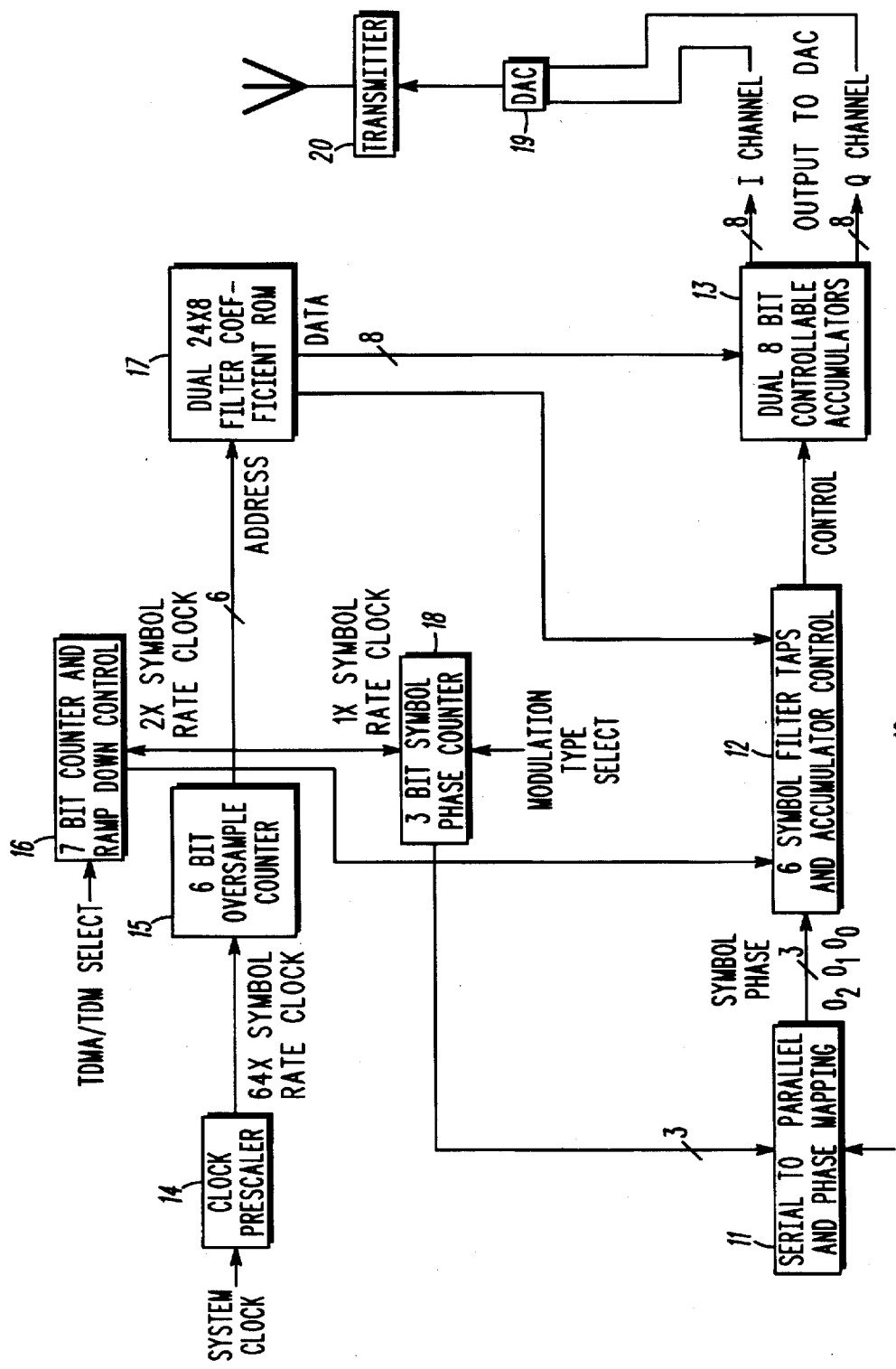
FIG. 1 comprises a block diagram of a constellation encoder in accordance with an embodiment of the invention.

FIG. 1 is a block diagram of a dual-mode constellation symbol generator 10, generally, in accordance with an embodiment of the invention. In a first mode, the constellation symbol generator 10 provides waveformed outputs for a differential phase encoded 4-QAM constellation at locations 00–11 (FIG. 2) in the I/Q plane based upon information from a serial information stream and an offset factor received from a phase counter 18. In a second mode the constellation symbol generator 10 provides π/4 DQPSK constellation symbols 0002–1112 (FIG. 3) in the I/Q plane based upon information from the information stream and an offset factor from the phase counter 18. Selection of the first or second mode is via a modulation selector input to the phase counter 18.

Included within the constellation symbol generator 10 is a serial to parallel converter 11, filter tap register 12 and at least one accumulator 13. The serial to parallel converter 11 receives the serial information bit stream under a serial format and divides the information bit stream into successive representations of constellation symbols using bit pairs D0 and D1.

DQPSK is accomplished (for 4-QAM) within a phase mapping section of the serial to parallel converter 11. The constellations (FIGS. 2 and 3) include symbols located on a unit circle that can be described by a vector of a unit length with a phase angle. The values ($\phi_2, \phi_1, \phi_0$) in such a case represent a constellation phase angle defining a constellation symbol. The values ($\phi_2, \phi_1, \phi_0$) defining the phase angle (including phase offset) are determined using bit pairs, D0 and D1, to produce output values ($\phi_2, \phi_1, \phi_0$) as follows:

$$\phi_2(n) = (\phi_2(n-1) \oplus D0) \cdot \phi_1(n-1) + (\phi_2(n-1) \oplus D1) \cdot \phi_1(n-1)$$

$$\phi_1(n) = D0 \oplus D1 \oplus \phi_1(n-1)$$

$$\phi_0(n) = 0$$

where the operator "$\oplus$" represents an exclusive-or operation and the operator "$\cdot$" represents an "anding" function.

For $\pi/4$ DQPSK modulation an additional phase offset (three-bit value) from the phase counter 18 is added to the phase angle ($\phi_2, \phi_1, \phi_0$) within the phase mapping section of the serial to parallel converter 11. For 4-QAM the phase counter 18 is held reset. FIG. 4 is a table providing a comparison of differential phase encoded values based upon possible values of D0 and D1.

From the serial to parallel converter 11, symbols ($\phi_2, \phi_1, \phi_0$) are successively shifted into a 6 symbol shift register within the filter tap register 12. Within the filter tap register 12 a finite impulse response filtering and summing operation takes place on the 6 symbols to successively produce at least one output filtered symbol sample per symbol interval based upon contributions of each of the six symbols.

Figure 5:
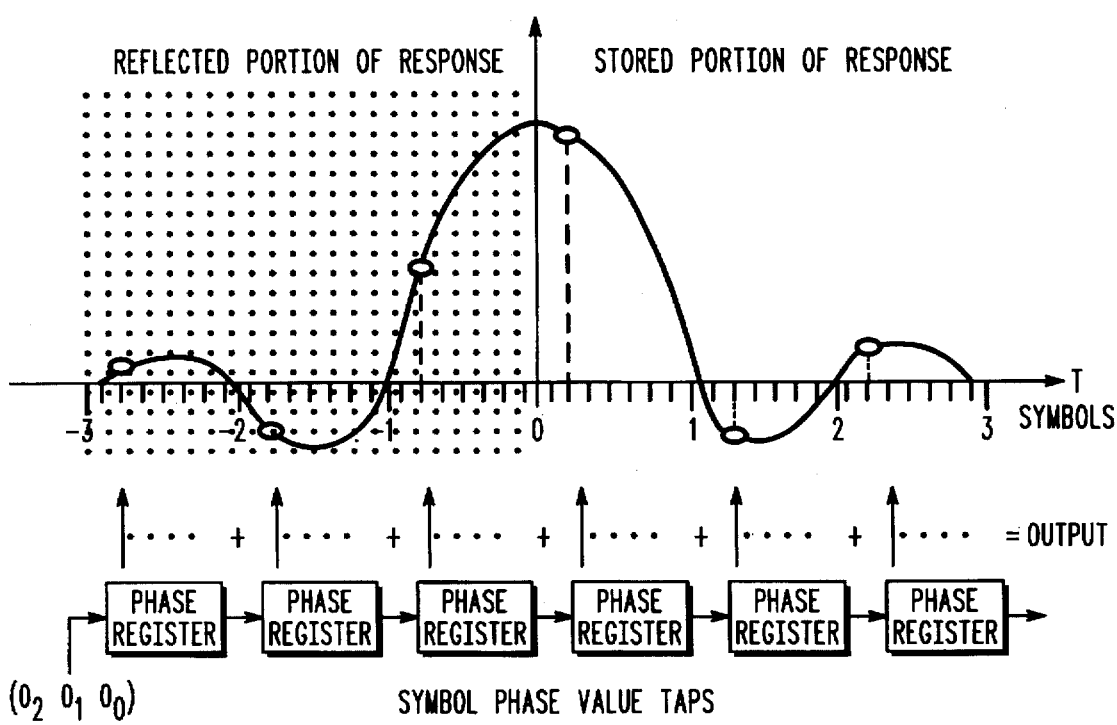
FIG. 5 illustrates waveform filtering of constellation filtering in accordance with an embodiment of the invention.

FIG. 5 is a semi-graphical representation of the mechanism of filtering within the filter tap register 12 under an embodiment of the invention. Shown in the graph at the top of FIG. 5 is a representation of filter tap values from read-only memory (ROM) 17 used in filtering the 6 symbols within the shift register (depicted at the bottom of FIG. 5). The filter tap values are depicted as having 8 values for each symbol interval of the shift register 12.

In evaluating the output symbols of the constellation symbol generator 10, sample values of output symbols are accumulated within the accumulator 13 over 8 sample points within the output symbol interval for each output symbol.

In determining each of the 8 sample values for an output symbol a contribution must be calculated from each symbol of the filter tap register 12 for each of the 8 output sample values. The contribution of each symbol is determined by multiplication of each symbol by the 8 tap values corresponding to the symbol within the filter tap register 12 and vector adding the eight respective values within the accumulator 13.

For convenience in determining respective contributions, each symbol of the filter tap register 12 is divided into respective I and Q values for multiplication by tap values and for summation within the accumulator 13. Each output value of the 8 sample values is, consequently, output in terms of its I and Q components for each of the 8 sample points.

By way of example, a set of symbols (represented by phase angle values 000, 010, 100, 110, 000, and 010) of a 4-QAM DQPSK signal will be assumed to occupy the shift register 12. Calculated I and Q values in such a case are: 1/√2, 1/√2; −1/√2, 1/√2; −1/√2, −1/√2; 1/√2, −1/√2; 1/√2, 1/√2, and −1/√2, 1/√2. Tap values may be read from the graph of FIG. 5 (with a maximum tap value normalized to 1). From the tap values for each symbol, I and Q sample values for each symbol may be determined as shown in TABLE 1. From the I and Q Sample values of TABLE 1, OUTPUT I and Q values may be determined by accumulating corresponding I values of the 6 symbols and corresponding Q values of the 6 symbols.

TABLE 1

| Symbol | Values I | Q | Symbol Tap Value 1 | 2 | 3 | 4 | 5 | 6 | 7 | 8 |
|---|---|---|---|---|---|---|---|---|---|---|
| 000 | $1/\sqrt{2}$, | $1/\sqrt{2}$ | 0.042 | 0.083 | 0.088 | 0.088 | 0.079 | 0.033 | −0.042 | −0.108 |
| | I Samples | | 0.030 | 0.059 | 0.062 | 0.062 | 0.056 | 0.023 | −0.030 | −0.076 |
| | Q Samples | | 0.030 | 0.059 | 0.062 | 0.062 | 0.056 | 0.023 | −0.030 | −0.076 |
| 010 | $-1/\sqrt{2}$, | $1/\sqrt{2}$ | −0.125 | −0.258 | −0.266 | −0.254 | −0.233 | −0.150 | 0.040 | 0.183 |
| | I Samples | | 0.088 | 0.182 | 0.188 | 0.180 | 0.165 | 0.106 | −0.028 | −0.129 |
| | Q Samples | | 0.088 | −0.182 | −0.188 | −0.180 | −0.165 | −0.106 | 0.028 | 0.129 |
| 100 | $-1/\sqrt{2}$, | $-1/\sqrt{2}$ | 0.417 | 0.625 | 0.792 | 0.892 | 0.958 | 0.992 | 1.000 | 0.992 |
| | I Samples | | −0.294 | −0.442 | −0.559 | −0.630 | −0.678 | −0.701 | −0.707 | −0.701 |
| | Q Samples | | 0.294 | −0.442 | −0.559 | −0.630 | −0.678 | −0.701 | −0.707 | −0.701 |
| 110 | $1/\sqrt{2}$, | $-1/\sqrt{2}$ | 0.958 | 0.892 | 0.792 | 0.625 | 0.417 | 0.183 | 0.040 | −0.15 |
| | I Samples | | 0.677 | 0.631 | 0.560 | 0.442 | 0.295 | 0.129 | 0.028 | 0.106 |
| | Q Samples | | 0.677 | −0.631 | −0.560 | −0.442 | −0.295 | −0.129 | −0.028 | −0.106 |
| 000 | $1/\sqrt{2}$, | $1/\sqrt{2}$ | −0.233 | −0.254 | −0.266 | −0.258 | −0.125 | −0.108 | −0.042 | −0.033 |
| | I Samples | | 0.677 | 0.631 | 0.560 | 0.442 | 0.295 | 0.129 | 0.028 | 0.106 |
| | Q Samples | | 0.677 | 0.631 | 0.560 | 0.442 | 0.295 | 0.129 | 0.028 | 0.106 |

TABLE 1-continued

| | Values | | Symbol Tap Value | | | | | | | |
|---|---|---|---|---|---|---|---|---|---|---|
| Symbol | I | Q | 1 | 2 | 3 | 4 | 5 | 6 | 7 | 8 |
| 010 | $-1/\sqrt{2}$ | $1/\sqrt{2}$ | 0.079 | 0.088 | 0.088 | 0.083 | 0.042 | 0.008 | 0.000 | −0.008 |
| | I Samples | | −0.056 | −0.062 | −0.062 | −0.059 | −0.030 | −0.006 | −0.000 | 0.006 |
| | Q Samples | | 0.056 | 0.062 | 0.062 | 0.059 | 0.030 | 0.006 | 0.000 | −0.006 |
| Output | I Samples | | 1.122 | 0.999 | 0.749 | 0.437 | 0.103 | −0.320 | −0.709 | −0.688 |
| Output | Q Samples | | −0.296 | −0.503 | −0.623 | −0.689 | −0.757 | −0.778 | −0.709 | −0.654 |

Output sample values (1–8) are successively shifted into a digital to analog converter (DAC) 19 for conversion to an analog signal. The analog signal is then transmitted using a conventional transmitter 20.

Where the symbol generator 10 operates under a time division multiplex (TDM) format, serial data is shifted into the filter tap register 12 under control of a system clock. Where the symbol generator 10 operates on a time division multiple access (TDMA) format then a 7 bit counter and ramp down control 16 functions to ramp the output signal at a beginning and an end of a transmission burst. Ramp-up control is provided within the 7 bit counter and ramp down control 16 by successively shifting values of zero into symbol filter tap positions (from left to right) across the filter tap register 12 during ramp-up. During ramp-down the 7 bit counter and ramp down control 16 successively shifts zeros into filter tap positions (from right to left).

The clock prescaler 14 and 6-bit oversample counter 15 adapt the system clock for finite impulse response filtering at the 8-times rate required by the filtering operation. Clock signals are provided to the dual 24×8 ROM for filter tap transfer to the filter tap register 12.

Use of the constellation generator 10 allows for the efficient generation of waveformed constellation symbols with a minimum of hardware and system complexity. Filter tap values (FIG. 5) are chosen to be symmetric about a center axis. Symmetry of tap values allows for a minimal number of tap values (3×8) to be stored in ROM. Use of a selectable 7 bit counter and ramp down control 16 and modulation type select 18 allows the symbol converter to be used in a variety of application with modulation control easily provided by operational software. The phase counter 18 provides a low-overhead apparatus (e.g., low current, low gate count, small die size, etc.) of switching between π/4 and 4 QAM modulation.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (e.g., 16 QAM operation), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

We claim:

1. An apparatus for encoding a signal, the apparatus comprising:

a serial to parallel converter and phase mapping device having a first input, a second input, and an output, the first input coupled to receive a serial data input stream, the output comprising phase data;

a filter tap module storing the phase data in a filter tap memory having a plurality of filter taps, each of the plurality of filter taps responsive to at least some of the phase data, the filter tap module having an output responsive to at least one of the plurality of filter taps and producing a filter tap control signal;

a memory containing a plurality of finite impulse response filter coefficients; and an accumulator coupled to the filter tap module and the memory, the accumulator receiving the filter tap control signal and the filter coefficients and performing an arithmetic operation on the finite impulse response filter coefficients in response to the filter tap control signal to produce an output signal.

2. The apparatus of claim 1, further comprising a counter in communication with the filter tap module.

3. The apparatus of claim 2, wherein the counter has a multi-mode input.

4. The apparatus of claim 1, wherein the serial to parallel converter and phase mapping device includes a phase mapping section that maps the serial data input stream into the phase data.

5. The apparatus of claim 1, wherein the second input comprises a phase data input.

6. The apparatus of claim 1, wherein the second input is responsive to a phase counter.

7. The apparatus of claim 1, wherein the filter tap module is responsive to a counter.

8. The apparatus of claim 7, wherein a predetermined value is stored in at least one of the plurality of filter taps in response to the output of the counter.

9. The apparatus of claim 8, wherein the predetermined value is a value representing zero.

10. The apparatus of claim 8, wherein the predetermined value is shifted into one of the plurality of filter taps when the counter is performing one of a ramping down and a ramping up operation.

11. The apparatus of claim 1, wherein a value representing zero is stored in at least one of the plurality of filter taps.

12. The apparatus of claim 1, wherein the output signal comprises an inphase signal and a quadrature signal.

13. An apparatus for encoding a signal, the apparatus comprising:

a phase counter;

a serial to parallel converter and phase mapping device responsive to the phase counter, the serial to parallel converter and phase mapping device having an input, and an output, the input coupled to receive a serial data input stream, the output comprising phase data;

a filter tap module storing the phase data in a filter tap memory having a plurality of filter taps, each of the plurality of filter taps being responsive to at least some of the phase data, the filter tap module further comprising an output responsive to at least one of the plurality of filter taps and producing a filter tap control signal;

a memory containing a plurality of finite impulse response filter coefficients; and an accumulator responsive to the filter tap module and the memory, the accumulator performing an arithmetic operation on the filter coefficients in response to the filter tap control signal, the accumulator producing an output signal.

14. The apparatus of claim 13, further comprising a second counter in communication with the filter tap module.

15. The apparatus of claim 14, wherein the second counter has a multi-mode input.

16. The apparatus of claim 13, wherein the serial to parallel converter and phase mapping device includes a phase mapping section that maps the serial data input stream into the phase data.

17. An apparatus for encoding a signal for use with a radio frequency transmitter, the apparatus comprising:

a serial to parallel converter and phase mapping device, the serial to parallel converter and phase mapping device having an input and an output, the input coupled to receive a serial data input stream and the output comprising phase data;

a filter tap module storing the phase data in a filter tap memory having a plurality of filter taps, each of the plurality of filter taps being responsive to at least some of the phase data, the filter tap module further comprising an output responsive to at least one of the plurality of filter taps and producing a filter tap control signal;

a ramping control counter in communication with the filter tap module;

a memory containing a plurality of filter coefficients; and an accumulator responsive to the filter tap module and the memory, the accumulator performing an arithmetic operation on the filter coefficients in response to the filter tap control signal.

18. The apparatus of claim 17, wherein the filter tap module stores a predetermined value into the filter tap memory in response to the ramping control counter.

19. The apparatus of claim 17, wherein the serial to parallel converter and phase mapping device includes a phase mapping section that maps the serial data input stream into the phase data.

20. The apparatus of claim 17, wherein the accumulator produces a baseband signal.

* * * * *